Dec. 20, 1955  E. H. NOLL  2,727,750
NESTABLE SHOPPING CART HAVING TILTABLE BODY
Filed July 9, 1953  2 Sheets-Sheet 1

INVENTOR.
EDWARD H. NOLL
BY Albert R. Golrick
ATTORNEY

Dec. 20, 1955  E. H. NOLL  2,727,750
NESTABLE SHOPPING CART HAVING TILTABLE BODY
Filed July 9, 1953  2 Sheets-Sheet 2

INVENTOR.
EDWARD H. NOLL
BY Albert R. Golrick
ATTORNEY

United States Patent Office

2,727,750
Patented Dec. 20, 1955

2,727,750
NESTABLE SHOPPING CART HAVING TILTABLE BODY

Edward H. Noll, Avon Lake, Ohio

Application July 9, 1953, Serial No. 366,994

8 Claims. (Cl. 280—33.99)

The present invention relates to improvements in shopping carts and, more particularly, to an improved nesting shopping cart with adjustable load carrying members.

In modern self-service grocery markets, goods are classified and arranged on open shelves to be readily available to customers who personally select, collect and transport the goods desired to a check out station or counter where a store clerk checks through the purchases, tallying and adding the prices and collecting the net payment due. By the usual manner of operation, the customer picks up a shopping cart upon entering the store for transporting articles selected and at the check out counter unloads the articles from the cart onto a counter surface for tallying, packaging or bagging by the check out counter personnel. The empty carts are then returned to a storage area near the entrance for re-use.

To facilitate the check out procedure, each check out station, in addition to clerk space, a cash register stand and cart passageway, usually includes a counter providing an area for receiving goods unloaded by a waiting customer, another area near the clerk for goods being tallied, with a further area to which the goods are moved for packaging as they are tallied by the clerk. For moving articles from the unloading area to the tallying area, the counters may be provided with slideable frames or intermittently operated belt conveyors, which devices accelerate the check out procedure. Particularly in larger stores where several check out stations are required, valuable floor space is occupied by the counters, the cart passageways and clerks' space adjacent thereto. Since considerable floor space is required for the storage of the needed carts, many and varied cart structures have been developed to permit nesting of the unused carts and thereby diminish the storage space required.

The present invention provides a nesting shopping cart of a radically different type from those used heretofore, although the cart may be manufactured of wire, sheet metal or tubular frame members such as have been used in the prior art. The cart comprises a wheeled chassis or frame preferably having a pair of caster wheels for dirigibility and a parcel receptacle or carrying body of extended length, pivotally mounted on the chassis with suitable locking means so that the parcel container body may be tilted to a nearly upright position for shopping and nesting storage or tilted to a horizontal position when passing a check out station. The body is divided into bins for segregation of wet, crushable, or dusty or taxable items by transverse partitions hinged at one side and resting on stops at the opposite side of the body, which provide shelves open to the user propelling the cart when the body is tilted toward upright position, while the forward end of the body, that is, the end uppermost when the body is tilted, is provided with a telescoping or drawer-like extensible section.

This structure, hereinafter more fully described, is adapted by tilting the body to horizontal position to serve in place of the usual check out counter surfaces. By the use of shopping carts of this construction, the need of check out counter areas is obviated, thereby permitting a considerable economy of space heretofore used exclusively for check out stations. When the body is in horizontal position for checking out, the extensible end section may be drawn outwardly, thereby leaving free space dividing the goods through which the individual articles may be moved in tallying, thereby keeping a boundary between tallied and untallied goods. Since the partitions are hinged to swing in the direction of the initially opened space, articles may be moved through the partitions as the tallying progresses from the extended section to the other end.

The disposition of the partitions, when the body is in upright shopping position, encourages the pre-sorting of goods as selected by the customer. Thus, for example, where certain items may be subject to sales tax, use of one section of the body by the customer will expedite the tallying and check out. Moreover goods which are, for example, wet may be segregated.

An object of the present invention is the provision of a shopping cart of the nesting type of improved construction. Another object of the invention is the provision of a shopping cart having a package container body adapted to serve the functions of the presently used check out counters. Another object is the provision of a shopping cart more convenient for customers' use in shopping. Other objects and advantages of the invention will appear from the following description and the drawings, wherein.

Figure 1:
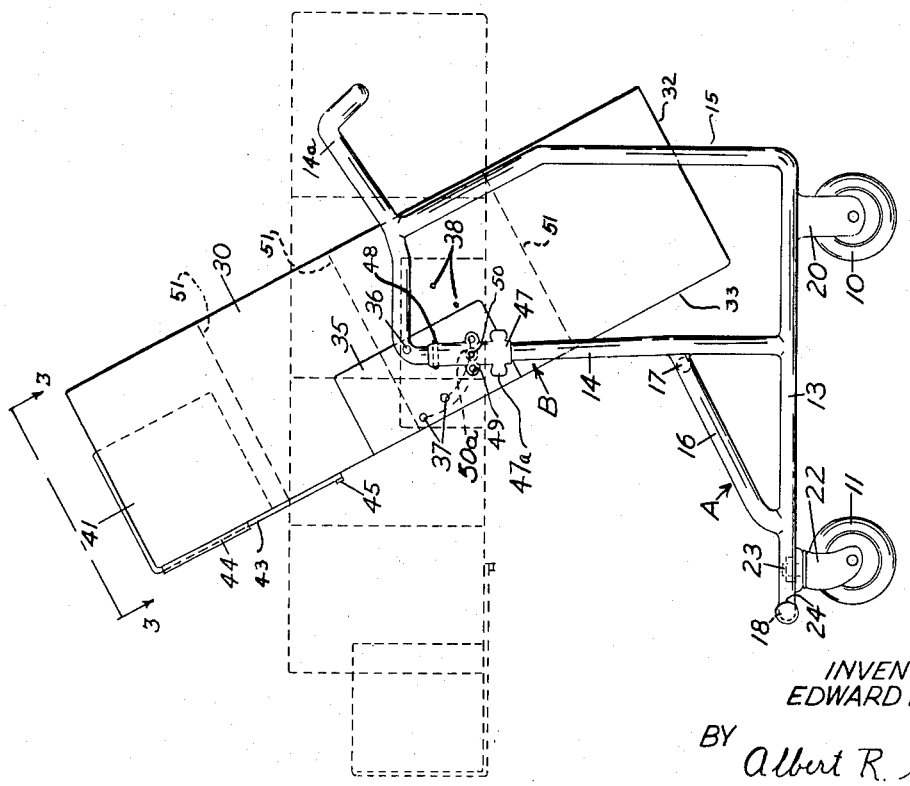
Fig. 1 is a side elevational view of the shopping cart of this invention with the parcel carrying body thereof shown in solid lines for the shopping or nesting position, but in dashed lines for the horizontal check out position.
Figure 3:
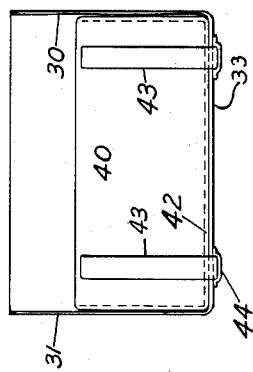
Fig. 3 is a detailed end view of the extensible end structure of the body viewed at 3—3 in Fig. 1.

In the drawings the shopping cart is shown as comprised of a tubular frame structure or chassis A provided with fixed rear wheels 10 and swivel or caster front wheels 11; and a partitioned parcel carrier body B of sheet metal or welded wire net structure pivotally mounted to the chassis, whereby it may be tilted to the generally upright position, shown in Fig. 1 in solid lines, for use in shopping or for nesting with other carts in storage, or swung to the horizontal position, shown in dashed outline in Fig. 1, for checking out of the store.

The vehicle frame A preferably formed from tubular members bent to shape and welded together into a unitary structure, is shown as comprising at each side a horizontal bottom member 13, upwardly extending primary weight support member 14, the top portion of which is reflected rearwardly, a rear member 15 extending upwardly from the back portion of member 13 and bent forwardly to join the top of member 14, and a handle or grip 14a secured to 14 and 15, which may be a continuation of the reflected top reach of 14. A brace member 16 extends from member 14 to the forward end of member 13 to reenforce the frame, while transverse members 17 and 18 between the members 14 and the forward ends of members 13 may serve not only as structural members joining the sides of the frame, but also respectively as a stop for the body when tilted into shopping position and as a base for a bumper 24 in the form of a rubber sheath. The rear wheels 10 are mounted between bracket plates 20 affixed to the under side of the rear portion of the members 13, while the front wheels are mounted by swivel or caster elements 22 with bases secured to the member 23 extending transversely between or beneath the forward ends of members 13.

The body B, shown as formed of sheet metal, is comprised of side panels 30, 31, an end panel 32 and bottom panel 33, which may be welded together or secured by other suitable means. At each side of the body near the mid-portion thereof there is affixed a re-enforcing plate 35 for receiving the pivot bolts or rivets 36 extending through the top of members 14 on one side of the vehicle, a body locking lever 47 is secured to the straight vertical portion of member 14. Two sets of paired holes 37, 38 are provided in the adjacent plate 35 to provide detent or locking holes corresponding to the horizontal and tilted body positions. Within the forward end of the body a drawer-like extensible section is slideably disposed, constituted of a forward end panel 40, side panels 41 and a bottom panel 42, all somewhat shorter in height than the main body panels. Right angle brackets 43, secured along one leg to the outer face of panel 40, and extending rearwardly beneath the bottom panel 33 through the guide channels or slideways 44 on the bottom face of panel 33, serve as means guiding and supporting the extensible section. The free inner ends of the members 43 are provided with stops 45, which may be screws threaded therein, bent end formations or stop members welded in place.

Figure 2:
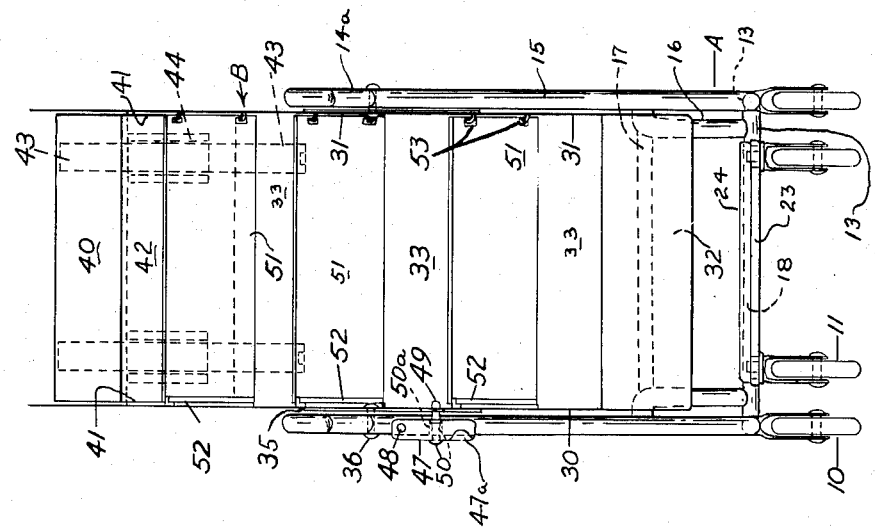
Fig. 2 is a rear elevational view of the shopping cart shown in Fig. 1.

As a means for locking the body at the check-out or shopping positions, plate 47, semi-cylindrical in shape with laterally extended finger grips 47a and pivoted at its upper end by the bolt or rivet 48 to the upper end of member 14, carries a pair of detent or latching pins 49 on laterally extending ears of the lever plate. A headed pin 50 secured to member 47 and extending through an aperture in tubular member 14 carries a compression spring 50a interposed between the tube wall and the inner headed end of the pin so that the lever plate 47 and latching pins thereon are biased toward plate 35. Preferably the holes of each pair are spaced at different radial distances from pivot 36, with the pins 49 correspondingly off-set. To swing the body from one position to the other, the latching lever is of course simply drawn outwardly, and released, as the body moves, to enter the other latching holes under the bias of the latch spring when the body reaches the new position. The transverse member 17 may also serve as a stop and support for the body at shopping position by locating it upward between members 14 and reducing its diameter to avoid interference with nesting. As may be clearly seen in Fig. 2, partitions 51 of the body are each secured by hinges 53 at one end to the side panel 31 with the other end resting upon stop 52 affixed to panel 30, so that the partitions swing toward the extensible end section. When the cart is in shopping position as in Fig. 2, these partitions form inclined shelves for segregation of goods.

Figure 4:
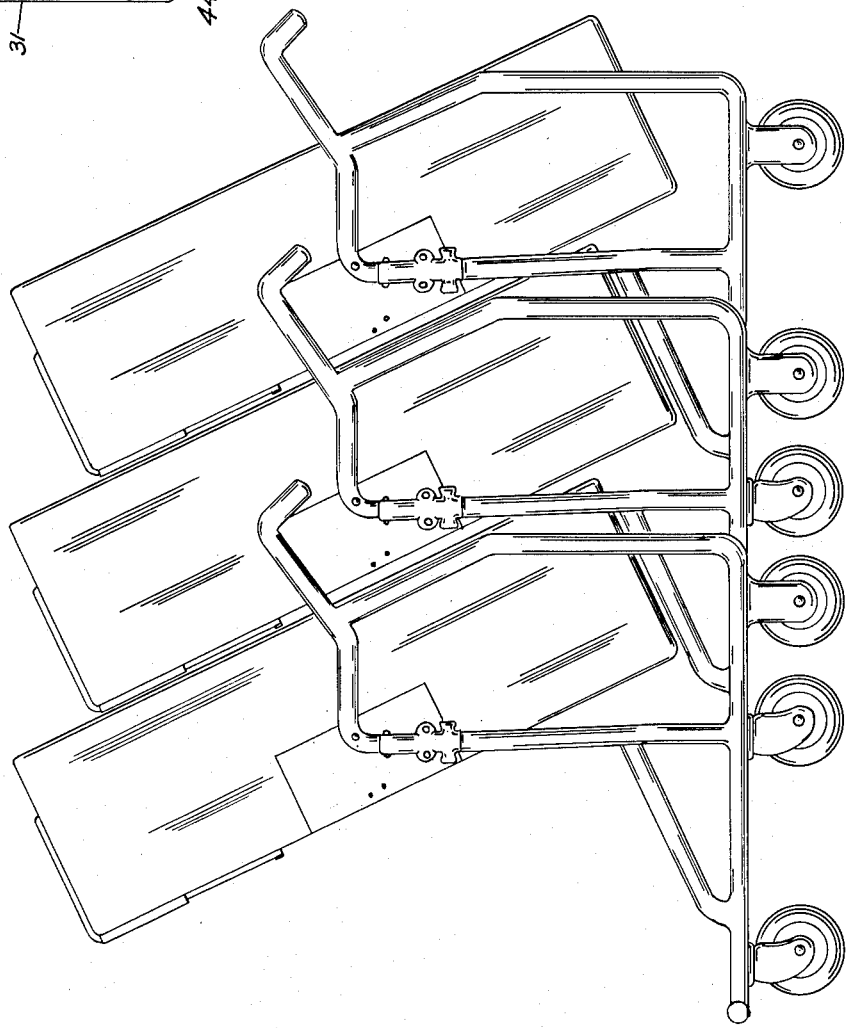
Fig. 4 is a side elevational view showing three shopping carts in nested position for storage.

To allow nesting of the carts for storage, as shown in Fig. 4, the braces 16 and the portions of members 13 forward of members 14 are bent or displaced inwardly to provide clearance between the rear reaches of members 13 and members 15 on one cart and the forward frame structure, that is, members 18, 24, 16 and forward reaches of 13 of another cart nested therein. In the fabrication of the frame, the handles or grips 14a may each be formed from a single tube with 14. So also members 13 and 15 on each side may be formed from a single tube, or if desired, one tube may be shaped to provide members 13, 15 of both sides and front member 18. The height of body B when in horizontal position is, of course, chosen for convenience of the check-out clerks in handling the articles. The chassis or frame may, of course, assume other forms, which, in location of forwardly extending, transverse, and receptacle supporting frame members relative to the tilted receptacle position and opening between the rear portions of the frame members, permit nesting of one cart with another in the manner disclosed. The position of the pivot axis relative to the wheel base and receptacle length may be varied as long as stability of the cart under probable loading is ensured.

The body B may be formed of sheet metal as shown, or of heavy wire welded into a mesh structure of suitably chosen spacing. In the latter case, the plates 35 are particularly advantageous for simplicity of structure as providing means for anchoring the pivot members 36 and positioning locating means engaging pins 49. Further, where the wire mesh structure is used, it is preferable that the longitudinal wire rods or strands in the bottom panel 33 be disposed in suitably spaced straight parallel fashion to form a bottom surface upon which articles may be slid during the tallying operation without becoming snagged in the wire net. Where the body is formed of sheet metal, perforations are located near the junction of end panel 32 and bottom panel 33 in either panel. As some articles such as leafy vegetables are usually kept moist on the display racks of the store in order to maintain freshness, by the use of the end panel 32 as the carrying shelf for such articles, moisture is permitted to drain away through the open mesh or perforations so that when the body is tilted to shopping position, no water has gathered in the body which may flow to other compartments and wet the packages there segregated. Preferably the drawer-like extension is used to receive any articles which are ordinarily handled as a special group in the tallying procedure such as those which may be subjected to a sales tax in contrast with the bulk of the goods or which may require particular handling during shopping or otherwise because of size, fragility or other specific distinguishing characteristic.

I claim:

1. A shopping cart comprising a wheel supported chassis, an elongated body pivotally mounted on and within the chassis providing a receptacle for merchandise, said chassis being shaped relative to the body to permit swinging of the body within the chassis about a horizontal pivot axis transverse to the chassis for selective positioning in a horizontal body disposition and in an inclined disposition, releasable means for locking the body relative to the chassis in selected disposition, and transverse partitions dividing the length of the body into compartments, said partitions each being hinged along one edge to one side of said body and resting at the opposite edge on stop means on the other side of the body to provide shelves when the body is in inclined disposition for stowing merchandise.

2. A shopping cart comprising a wheel supported chassis, an elongated body pivotally mounted on and within the chassis providing a receptacle for merchandise, said chassis being shaped relative to the body to permit swing of the body within the chassis about a horizontal pivot axis transverse to the chassis for selective positioning in a horizontal body disposition and in an inclined disposition, releasable means for locking the body relative to the chassis in selected disposition, and transverse partitions dividing the length of the body into compartments, said partitions each being hinged along one edge to one side of said body and resting at the opposite edge on stop means on the other side of the body to provide shelves when the body is in inclined disposition for stowing merchandise; and said body having an extensible end section including a body end wall.

3. A shopping cart comprising a wheel supported chassis; an elongated body pivotally mounted within the chassis to swing about a horizontal transverse axis from a horizontal disposition to an inclined disposition, said body being formed of a main bottom panel, main side panels, fixed and movable end panels enclosing a merchandise receptacle space; said body having at one end an extensible section including side and bottom panels telescoping relative to the said main panels, the said movable end panel, and guide means for the extensible end section; partitions disposed perpendicular to the main bottom panel each hinged at one edge to one of the side panels and resting upon stops on the opposite side panel to divide transversely the merchandise receptacle space and providing shelves when the body is in inclined disposition; and means for locking the body relative to the chassis in the selected disposition.

4. A shopping cart comprising a wheel supported chassis; an elongated body pivotally mounted on and within the chassis to swing about a horizontal transverse axis from a horizontal disposition to an inclined disposition, said body being formed of a main bottom panel, main side panels, fixed and movable end panels enclosing a merchandise receptacle space; said body having at one end an extensible section including side and bottom panels telescoping relative to the said main panels, the said movable end panel, and guide means for the extensible end section; partitions disposed perpendicular to the main bottom panel each hinged at one edge to one of the side panels and resting upon stops on the opposite side panel to divide transversely the merchandise receptacle space and providing shelves when the body is in upright disposition, said partitions being free of said stops to swing toward said extensible section; and means for locking the body relative to the chassis in the selected disposition.

5. A shopping cart comprising a wheel supported chassis; an elongated body pivotally mounted on and within the chassis to swing about a horizontal transverse axis from a horizontal disposition to a forwardly inclined disposition, said body being formed of a main bottom panel, main side panels, fixed and movable end panels enclosing a merchandise receptacle space; said body having at one end an extensible section including side and bottom panels telescoping relative to the said main panels, the said movable end panel, and guide means for the extensible end section; partitions disposed perpendicular to the main bottom panel each hinged at one edge to a side panel and resting upon stop means on the opposite side panel to divide transversely the merchandise receptacle space and providing shelves when the body is in upright disposition; and means for locking the body relative to the chassis in the selected disposition; said chassis including on each side a lower member disposed lengthwise and an upwardly extending member for pivotal connection to one side of said body forming a side frame structure, transverse members connecting said side frame structures into a rigid chassis frame rearwardly open, and a pair of front wheels and a pair of rear wheels supporting said frame, one of said wheel pairs being caster mounted for cart dirigibility; the lower end of said body when in inclined position being upwardly spaced from said lower members and said lower members being forwardly convergent toward each other, whereby one cart with body in said inclined disposition may be nested with another cart of like disposition by directing the forward convergent portions of said lower members of one cart between the rear portions of the lower members of and beneath the lower body end of the other cart.

6. A shopping cart comprising a wheel supported chassis formed of lateral base members mounting forward and spaced paired rear wheels, side members rigidly secured to and extending upwardly from said base members, and transverse members connecting the members of one side to those of the other to provide a rigid frame rearwardly open, the forward part of said base members being tapered toward each other whereby the forward part of one cart chassis may be nested within the rear portion of a like truck chassis; an elongated body pivotally mounted on the chassis between said side members to pivot about an axis horizontal and transverse to said body and chassis providing a receptacle for merchandise; the members of said chassis being shaped relative to the body to permit swinging of the body within the chassis about said pivot axis for selective disposition of the body with its length horizontal or inclined at a near upright disposition, the body when in inclined position having its lower end upwardly spaced from said base members whereby when the body is in inclined position one cart may be nested with another cart with body in inclined position; releasable means for locking the body relative to the chassis in selected disposition; and transverse partitions dividing the length of the body into compartments, said partitions each being hinged along one edge to one side of said body and resting at the opposite edge on stop means on the other side of the body to provide shelves when the body is in inclined disposition for stowing merchandise.

7. A shopping cart comprising a wheel supported chassis formed of lateral base members mounting forward and spaced paired rear wheels, side members rigidly secured to and extending upwardly from said base members, rearwardly extending handle elements on each side secured to one of said members, and transverse members connecting the members of one side to those of the other to provide a rigid frame rearwardly open, the forward part of said base members being tapered toward each other whereby the forward part of one cart chassis may be nested within the rear portion of a like truck chassis; an elongated body pivotally mounted on the chassis between said side members to pivot about an axis horizontal and transverse to said body and chassis providing a receptacle for merchandise; the members of said chassis being shaped relative to the body to permit swinging of the body within the chassis about said pivot axis for selective disposition of the body with its length horizontal or inclined at a near upright disposition, the body when in inclined position having its lower end upwardly spaced from said base members whereby when the body is in inclined position one cart may be nested with another cart with body in inclined position; releasable means for locking the body relative to the chassis in selected disposition; and transverse partitions dividing the length of the body into compartments, said partitions each being hinged along one edge to one side of said body and resting at the opposite edge on stop means on the other side of the body to provide shelves when the body is in inclined disposition for stowing merchandise; and said body having an extensible end section including the body end wall uppermost when the body is in inclined disposition.

8. A shopping cart comprising a wheel supported chassis formed of lateral base members mounting forward and spaced paired rear wheels, side members rigidly secured to and extending upwardly from said base members, and transverse members connecting the members of one side to those of the other to provide a rigid frame rearwardly open, the forward part of said base members being tapered toward each other whereby the forward part of one cart chassis may be nested within the rear portion of a like truck chassis; an elongated body pivotally mounted on the chassis between said side members to pivot about an axis horizontal and transverse to said body and chassis providing a receptacle for merchandise, said pivot axis being located relative to the body length and chassis wheel base length for cart stability under loaded conditions; the members of said chassis being shaped relative to the body to permit swinging of the body within the chassis about said pivot axis for selective disposition of the body with its length horizontal or inclined at a near upright disposition, the body when in inclined position having its lower end upwardly spaced from said base members whereby when the body is in inclined position one cart may be nested with another cart with body in inclined position; releasable means for locking the body relative to the chassis in selected disposition; and transverse partitions dividing the length of the body into compartments, said partitions each being hinged along one edge to one side of said body and resting at the opposite edge on stop means on the other side of the body to provide shelves when the body is in inclined disposition for stowing merchandise; and said body having an extensible end section including the body end wall uppermost when the body is in inclined disposition.

References Cited in the file of this patent

UNITED STATES PATENTS

| Number | Name | Date |
|---|---|---|
| 2,583,514 | Maslow | Jan. 22, 1952 |
| 2,605,116 | Alexander | July 29, 1952 |
| 2,662,661 | Goldman | Dec. 15, 1953 |